(12) United States Patent
Graney, IV et al.

(10) Patent No.: US 11,794,148 B2
(45) Date of Patent: Oct. 24, 2023

(54) NATURAL GAS SYSTEM FOR ON-SITE PROCESSING

(71) Applicant: Nacelle Logistics LLC, Charleston, WV (US)

(72) Inventors: Patrick C. Graney, IV, Charleston, WV (US); Gouverneur C. M. Graney, Charleston, WV (US); Peter Morcheid, Charleston, WV (US)

(*) Notice: Subject to any disclaimer, the term of this patent is extended or adjusted under 35 U.S.C. 154(b) by 268 days.

(21) Appl. No.: 17/408,433

(22) Filed: Aug. 22, 2021

(65) Prior Publication Data

US 2023/0058457 A1 Feb. 23, 2023

(51) Int. Cl.
| | |
|---|---|
| *B01D 53/22* | (2006.01) |
| *B01D 63/02* | (2006.01) |
| *B01D 17/04* | (2006.01) |
| *B01D 17/00* | (2006.01) |
| *B01D 61/58* | (2006.01) |

(52) U.S. Cl.
CPC .......... *B01D 63/02* (2013.01); *B01D 17/045* (2013.01); *B01D 17/085* (2013.01); *B01D 53/226* (2013.01); *B01D 53/228* (2013.01); *B01D 61/58* (2013.01); *B01D 2256/24* (2013.01); *B01D 2311/14* (2013.01)

(58) Field of Classification Search
CPC .............. B01D 53/226; B01D 2311/14; B01D 17/085; B01D 63/02; B01D 17/045; B01D 61/58; B01D 2256/24; B01D 53/228

See application file for complete search history.

(56) References Cited

U.S. PATENT DOCUMENTS

| | | | |
|---|---|---|---|
| 7,252,700 B1 | 8/2007 | Strahan | |
| 7,537,641 B2 | 5/2009 | Okhandwala | |
| 7,650,939 B2 | 1/2010 | Zubrin | |
| 7,655,070 B1* | 2/2010 | Dallas | B01D 39/04 428/221 |
| 8,211,215 B2 | 7/2012 | Schott | |
| 8,906,143 B2 | 12/2014 | Lokhandwala | |

(Continued)

FOREIGN PATENT DOCUMENTS

WO     WO 99/44405     9/1999

*Primary Examiner* — Anthony R Shumate
(74) *Attorney, Agent, or Firm* — Andrew W. Ludy

(57) ABSTRACT

A natural gas processing system is mounted on a mobile platform that is transported to a natural gas source, such as a well. The system supplies retentate gas to operate multi-fuel engines for wellfield equipment such as pumps, compressors, and drills. A liquid drain discharges contaminants. A separator, first and second coalescing filters, and a particulate filter remove particulate matter and fluid contaminant matter from the natural gas. A dryer removes water vapor from the natural gas. Dual membranes separate the natural gas into a retentate gas and a permeate gas. A first heat exchanger adjusts temperature of the natural gas entering the membranes. A second heat exchanger adjusts temperature of the retentate gas output. A thermoelectric generator powered by the natural gas supplies process electricity. A process control monitors and controls the natural gas processing system, including pressure control valves, temperature control valves, and emergency shutdown systems. An instrument gas supply with an accumulator supplies gas pressure to operate pneumatic valves and instruments.

36 Claims, 14 Drawing Sheets

(56) References Cited

U.S. PATENT DOCUMENTS

| | | |
|---|---|---|
| 9,263,661 B2 | 2/2016 | Haider |
| 9,302,227 B2 | 4/2016 | Lokhandwala |
| 9,475,020 B2 | 10/2016 | Coli |
| 9,975,085 B2 * | 5/2018 | Pan .................. B01D 51/10 |
| 10,107,084 B2 | 10/2018 | Coli |
| 2009/0065436 A1 * | 3/2009 | Kalayci ............. B01D 39/1623 502/402 |
| 2009/0107917 A1 * | 4/2009 | Capehart ................. C02F 9/00 210/207 |
| 2010/0230830 A1 * | 9/2010 | Farsad .................. B01D 53/78 261/111 |
| 2012/0301377 A1 * | 11/2012 | Gonzalez Portales .................... B01D 53/50 423/210 |
| 2015/0267871 A1 * | 9/2015 | Murray, Sr. ............. F23N 1/002 137/1 |
| 2015/0328565 A1 * | 11/2015 | Swaminathan .... B01D 39/1623 210/489 |
| 2016/0024409 A1 * | 1/2016 | Murray, Sr. ......... F02D 19/0647 48/127.3 |
| 2016/0136554 A1 * | 5/2016 | Swaminathan .... B01D 39/1623 55/486 |
| 2016/0361674 A1 * | 12/2016 | Swaminathan ........ B01D 39/04 |
| 2017/0341006 A1 * | 11/2017 | Boesner ................ B01D 39/18 |
| 2018/0073446 A1 | 3/2018 | Ritter |
| 2021/0394116 A1 * | 12/2021 | Mast ................... G05B 19/042 |

\* cited by examiner

SOURCE GAS

DRYER

HEATER

RETENTATE

PERMEATE OUTLET

MEMBRANE ASSEMBLY

MEMBRANE ASSEMBLY

NATURAL GAS SYSTEM FOR ON-SITE PROCESSING

TECHNICAL FIELD

The presently disclosed technologies are directed to an apparatus and method that processes natural gas, and in particular, a transportable apparatus for processing natural gas at the wellhead.

BACKGROUND

It is often uneconomical or impractical to capture and transport natural gas in a special pipeline from the wellhead to a refinery. In these cases the gas is flared off, or burned. It is thus wasted, both as a source of energy and as a valuable commodity.

In those instances where a pipeline is built, other problems develop. Natural gas at the wellhead usually contains impurities such as carbon dioxide ($CO_2$), and hydrogen sulfide ($H_2S$). When dissolved in water, $CO_2$ is known as carbonic acid. Similarly, $H_2S$ becomes hydrosulfuric acid. Either of these acids will cause corrosion problems in pipelines and related equipment during transportation of natural gas.

The natural gas product at retail comprises almost pure methane, but source natural gas from the wellhead contains a variety of contaminants. In addition to the $CO_2$ and $H_2S$, other gases such as nitrogen and carbon dioxide may be found in oil and gas wells. Solid impurities include sand and dirt from the reservoir; and scale and corrosion products from the piping. The wells produce a mixture of hydrocarbon gas, condensate, or oil; and water with dissolved minerals such as salt. The oil and gas is processed to separate these components.

Natural gas condensate is a mixture of hydrocarbon liquids that are gaseous components of the natural gas produced by natural gas fields. It condenses from the source gas if the temperature drops below the dew point. The condensate gas includes mostly ethane, propane, butane and pentanes. These components are typically separated and sold.

Membranes are often used to separate source gas into components. Each component permeates through the membrane at a different rate. The components such as $CO_2$ and $H_2S$ and water will permeate faster through the membrane than components such as $N_2$ and methane. Thus, the feed stream is separated into retentate, which is mostly methane-rich natural gas and is depleted of heavy hydrocarbons; and permeate, which includes $CO_2$, $H_2S$, water, and heavier hydrocarbons described above as condensate gas.

Membranes are typically non-porous polymeric films. The most commonly used polymers for this purpose are polycarbonate, polysulfone, polyimide, and cellulose acetate. Membranes are produced in various configurations, such as flat sheets, spiral wound sheets, or hollow fibers. Hollow fibers are preferred due to having the highest packing density, meaning greatest membrane area per unit volume.

Some limited processing of source natural gas is often carried out at the well site. However, the complete processing of natural gas is typically carried out at a centralized process plant, or refinery. Gas from the wellhead is transported by pipeline or tanker vehicle to the refinery.

There are benefits for oil and gas companies to utilize natural gas on site to power engines, rather than trucking in diesel fuel or gasoline. Such engines, for example, would power drilling rigs or pump trucks during fracking. Using refined products, such as LNG or CNG, requires offsite processing, trucking and specialized equipment to deliver the fuel to the site. On site natural gas is source or field gas from a well or pipeline. The benefits include cost savings, employee safety, and less environmental disturbance.

Natural gas engines maintain the best performance and require the least maintenance when utilizing a dry, consistent BTU gas delivered at an optimal pressure and temperature. Various engine manufacturers spec different ideal BTU ranges but typically 1000 to 1100 BTU is the prime range that balances horsepower required to do the job with engine and exhaust heat that causes engine and maintenance issues. It is not economical to develop a pipeline infrastructure to a well pad for pre-processed gas to power engines.

Permeate natural gas produced by the process can be injected back into the pipeline or source well. This precludes storage or flaring of permeate.

Condensate can be stored in a tank on site. Alternatively, it can be sent to a customer liquids line.

Accordingly, there is a need to provide a system that is transportable to the wellhead site, and that is self-contained, and is capable of processing of source natural gas of varying quality found at the natural gas source.

There is a further need to provide a system of the type described, and that can process source gas into permeate and retentate, and that can remove contaminants.

There is a still further need to provide a system of the type described, and that is capable of being powered by fuels recovered at the wellhead, and of providing retentate fuels of adequate quality to power hybrid fuel engines on site.

There is a yet further need to provide a system of the type described, and that needs no air compressor, but utilizes source gas pressure to operate instruments and control valves.

SUMMARY

In one aspect, a natural gas processing system is used in connection with a natural gas source and raw source natural gas produced by the source. The natural gas processing system comprises a mobile platform that can be transported to the natural gas source. A liquid drain is juxtaposed with the mobile platform for discharging liquid contaminants from the natural gas processing system. A source natural gas valve is connected in fluid communication with the natural gas source for controlling the source natural gas entering the natural gas processing system.

A first coalescing filter is mounted on the mobile platform. The first coalescing filter is connected in fluid communication with the source natural gas valve and the liquid drain. The first coalescing filter is connected to the liquid drain through a remotely controlled first filter drain valve. The first coalescing filter removes fluid contaminant matter from the natural gas. The first coalescing filter also allows passage of the natural gas through the filter.

A dryer is mounted on the mobile platform, and is connected in fluid communication with the first coalescing filter and the liquid drain. The dryer is connected to the liquid drain through a remotely controlled dryer drain valve. The dryer removes water vapor from the natural gas. The dryer allows passage of the natural gas through the dryer.

A particulate filter is mounted on the mobile platform. The particulate filter is connected in fluid communication with the dryer and the liquid drain. The particulate filter removes particulate matter from the natural gas. The particulate filter allows passage of the natural gas through the filter.

A first membrane is mounted on the mobile platform. The first membrane is connected in fluid communication with the natural gas source. The first membrane separates the natural gas into a retentate gas and a permeate gas. The first membrane allows passage of the permeate gas through the first membrane, while restricting passage of the retentate gas through the first membrane.

A retentate valve is connected in fluid communication with the first membrane. The retentate valve controls the retentate gas exiting the natural gas processing system.

A permeate valve is connected in fluid communication with the first membrane. The permeate valve controls the permeate gas exiting the natural gas processing system.

In another aspect, a natural gas processing system is used in connection with a natural gas source and raw source natural gas produced by the source. The natural gas processing system comprises a mobile platform that can be transported to the natural gas source. A liquid drain is juxtaposed with the mobile platform for discharging liquid contaminants from the natural gas processing system.

A separator is mounted on the mobile platform. The separator is connected in fluid communication with the natural gas source and the liquid drain. The separator is connected to the liquid drain through a remotely controlled separator drain valve. The separator removes liquid contaminant matter from the natural gas. The separator allows passage of the natural gas through the separator.

A source natural gas valve is connected in fluid communication with the natural gas source and the separator. The source natural gas valve controls the source natural gas entering the separator.

A first coalescing filter is mounted on the mobile platform. The first coalescing filter is connected in fluid communication with the separator and the liquid drain. The first coalescing filter is connected to the liquid drain through a remotely controlled first filter drain valve. The first coalescing filter removes fluid contaminant matter from the natural gas. The first coalescing filter allows passage of the natural gas through the filter.

A dryer is mounted on the mobile platform. The dryer is connected in fluid communication with the coalescing filter and the liquid drain. The dryer is connected to the liquid drain through a remotely controlled dryer drain valve. The dryer removes water vapor from the natural gas. The dryer allows passage of the natural gas through the dryer.

A particulate filter is mounted on the mobile platform. The particulate filter is connected in fluid communication with the dryer and the liquid drain. The particulate filter removes particulate matter from the natural gas. The particulate filter allows passage of the natural gas through the filter.

A second coalescing filter is mounted on the mobile platform. The second coalescing filter is connected in fluid communication with the particulate filter and the liquid drain. The second coalescing filter is connected to the liquid drain through a remotely controlled second filter drain valve. The second coalescing filter removes particulate matter and fluid contaminant matter from the natural gas. The second coalescing filter allows passage of the natural gas through the filter.

A first membrane is mounted on the mobile platform. The first membrane is connected in fluid communication with the particulate filter. The first membrane separates the natural gas into a retentate gas and a permeate gas. The first membrane allows passage of the permeate gas through the membrane, and restricts passage of the retentate gas through the membrane.

A retentate valve is connected in fluid communication with the first membrane. The retentate valve controls the retentate gas exiting the natural gas processing system.

A permeate valve is connected in fluid communication with the first membrane. The permeate valve controls the permeate gas exiting the natural gas processing system.

In still another aspect, a method is disclosed for processing natural gas. The method is used in connection with a natural gas source and raw source natural gas produced by the source. The method comprises providing a mobile platform and adapting the mobile platform for transporting to the natural gas source.

Mounting a first coalescing filter on the mobile platform, and connecting a source natural gas valve in fluid communication with the first coalescing filter and the natural gas source. Controlling the source natural gas entering the first coalescing filter with the natural gas valve. Allowing passage of the natural gas through the first coalescing filter.

Removing fluid contaminant matter from the natural gas with the first coalescing filter. Draining the fluid contaminant matter from the first coalescing filter through a remotely controlled first filter drain valve and a liquid drain.

Mounting a dryer on the mobile platform. Connecting the dryer in fluid communication with the first coalescing filter. Allowing passage of the natural gas through the dryer.

Removing water vapor from the natural gas with the dryer. Draining the water from the dryer through a remotely controlled dryer drain valve and the liquid drain.

Mounting a particulate filter on the mobile platform. Connecting the particulate filter in fluid communication with the dryer. Allowing passage of the natural gas through the particulate filter.

Removing particulate matter from the natural gas with the particulate filter. Allowing water to drain from the particulate filter through the liquid drain.

Mounting a first membrane on the mobile platform. Connecting the first membrane in fluid communication with the particulate filter. Allowing passage of the natural gas through the first membrane.

Separating the natural gas into a retentate gas and a permeate gas with the first membrane. Allowing passage of the permeate gas through the first membrane. Restricting passage of the retentate gas through the first membrane.

Connecting a retentate valve in fluid communication with the first membrane. Controlling the retentate gas exiting the first membrane with the retentate valve.

Connecting a permeate valve in fluid communication with the first membrane. Controlling the permeate gas exiting the first membrane with the permeate valve.

These and other aspects, objectives, features, and advantages of the disclosed technologies will become apparent from the following detailed description of illustrative embodiments thereof, which is to be read in connection with the accompanying drawings.

Figure 1:
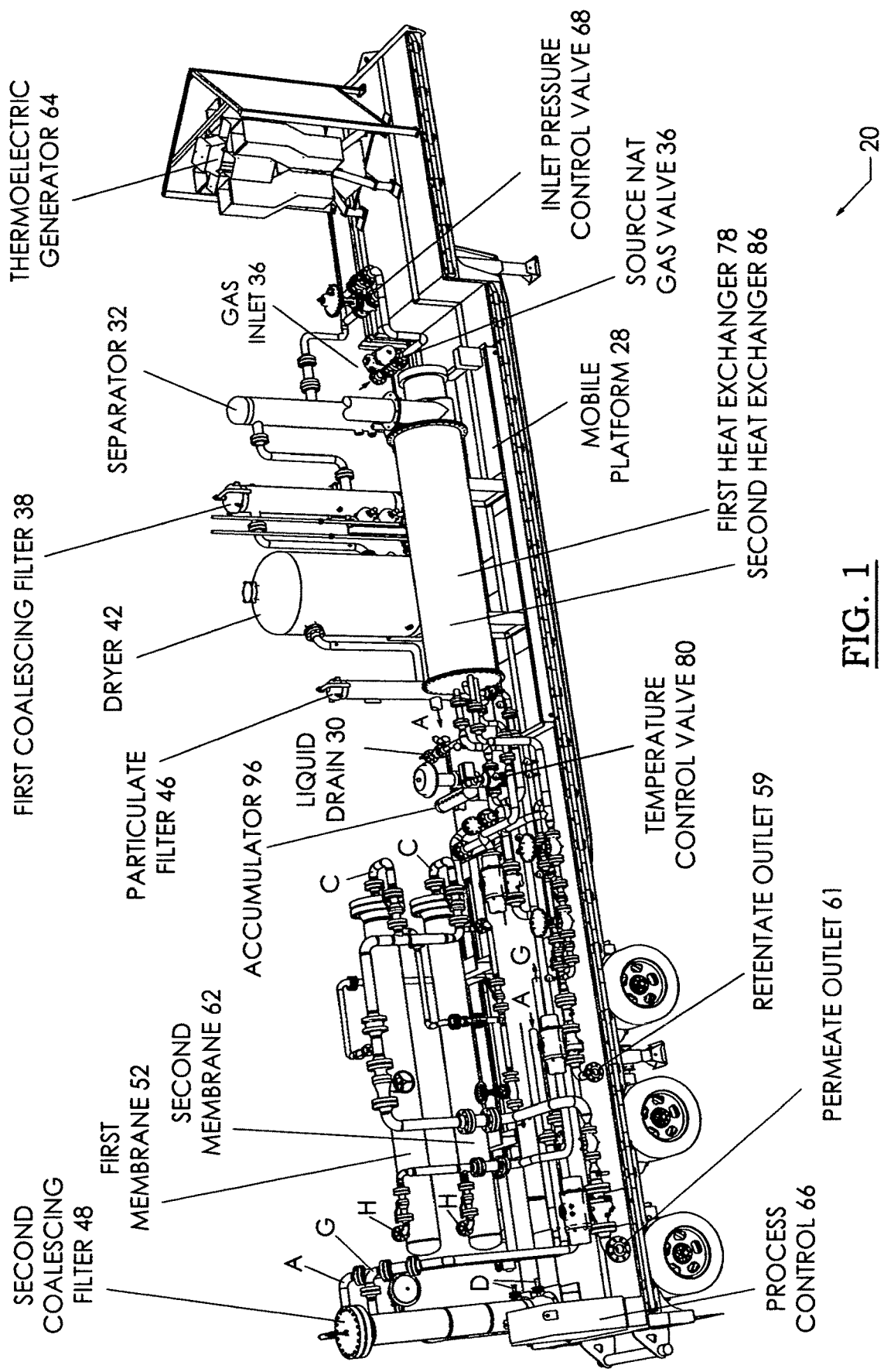
FIG. 1 is a right side perspective view of a natural gas processing system constructed in accordance with the invention.
Figure 2:
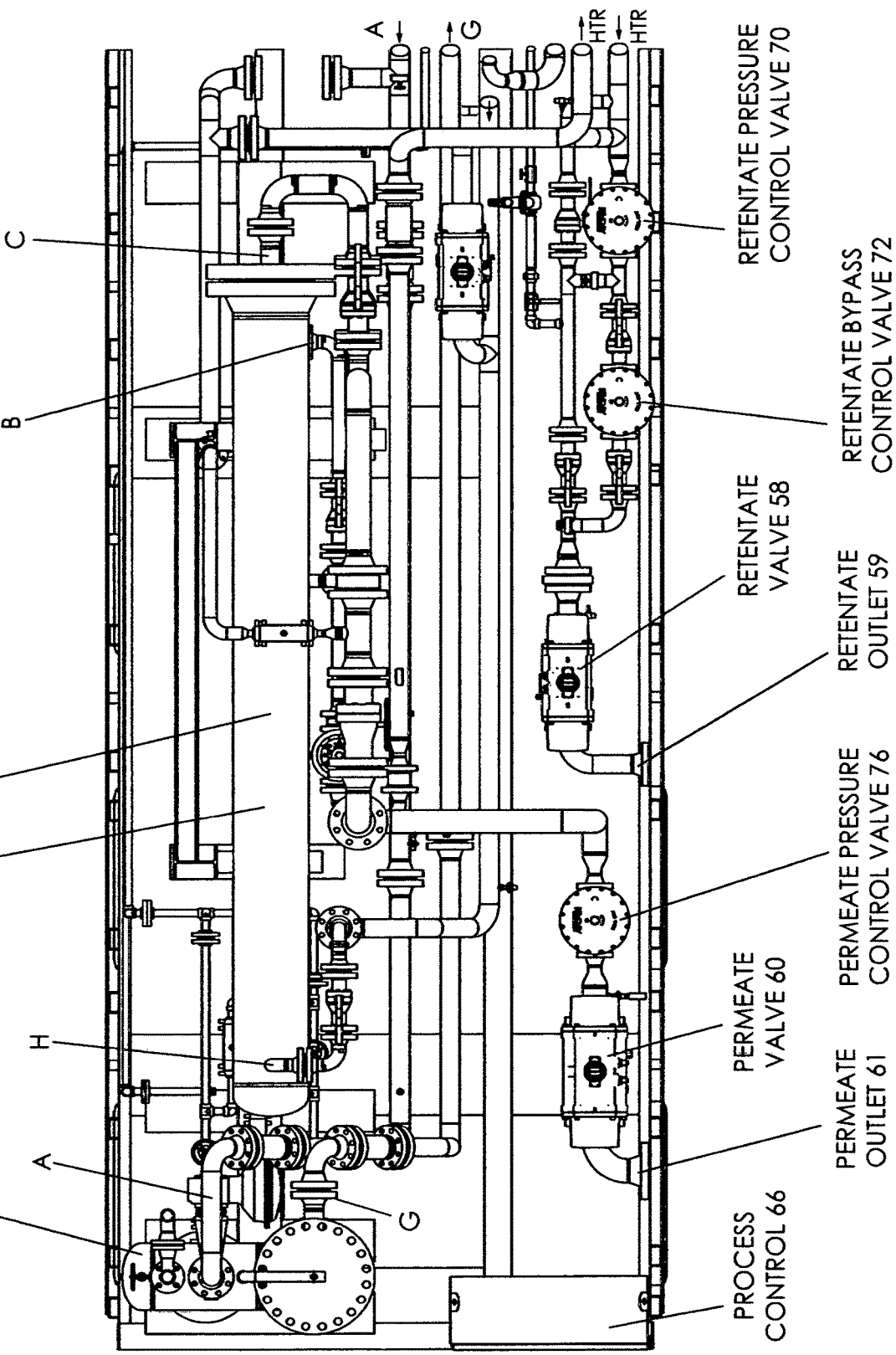
FIG. 2 is a top plan view of the natural gas processing system of FIG. 1, showing the rear portion of the platform.
Figure 3:
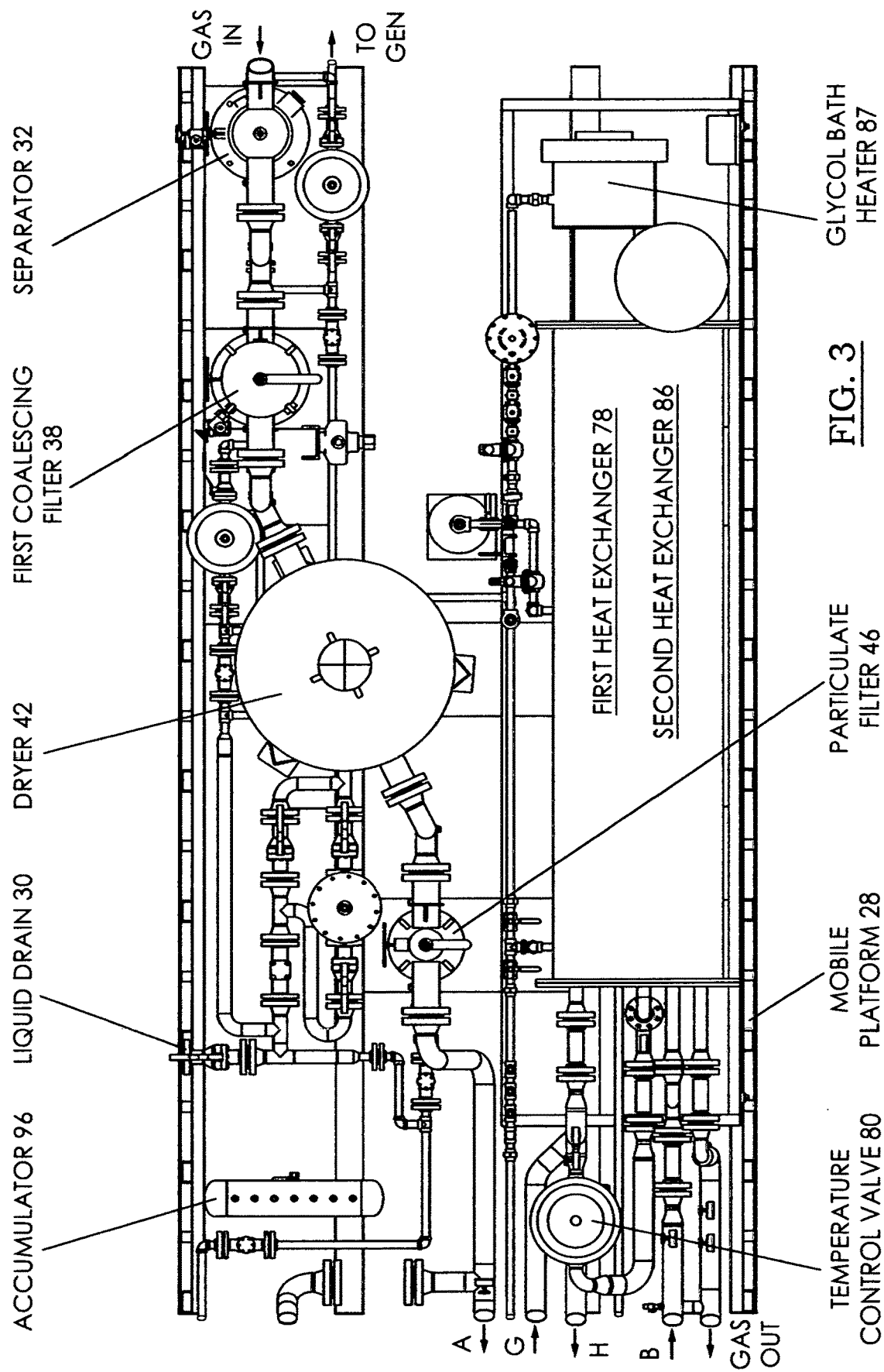
FIG. 3 is a top plan view of the natural gas processing system of FIG. 1, showing the central portion of the platform.
Figure 4:
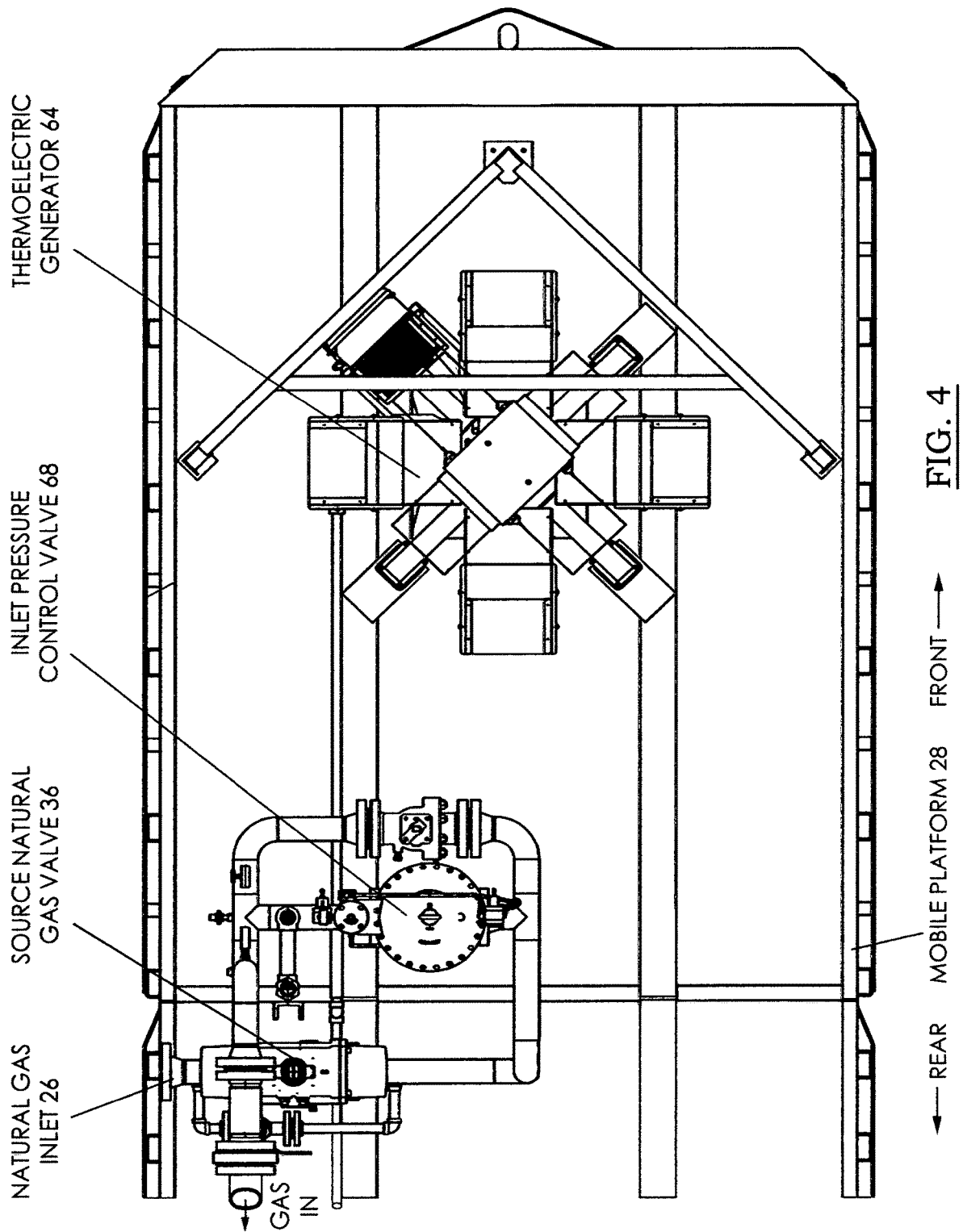
FIG. 4 is a top plan view of the natural gas processing system of FIG. 1, showing the forward portion of the platform.
Figure 5:
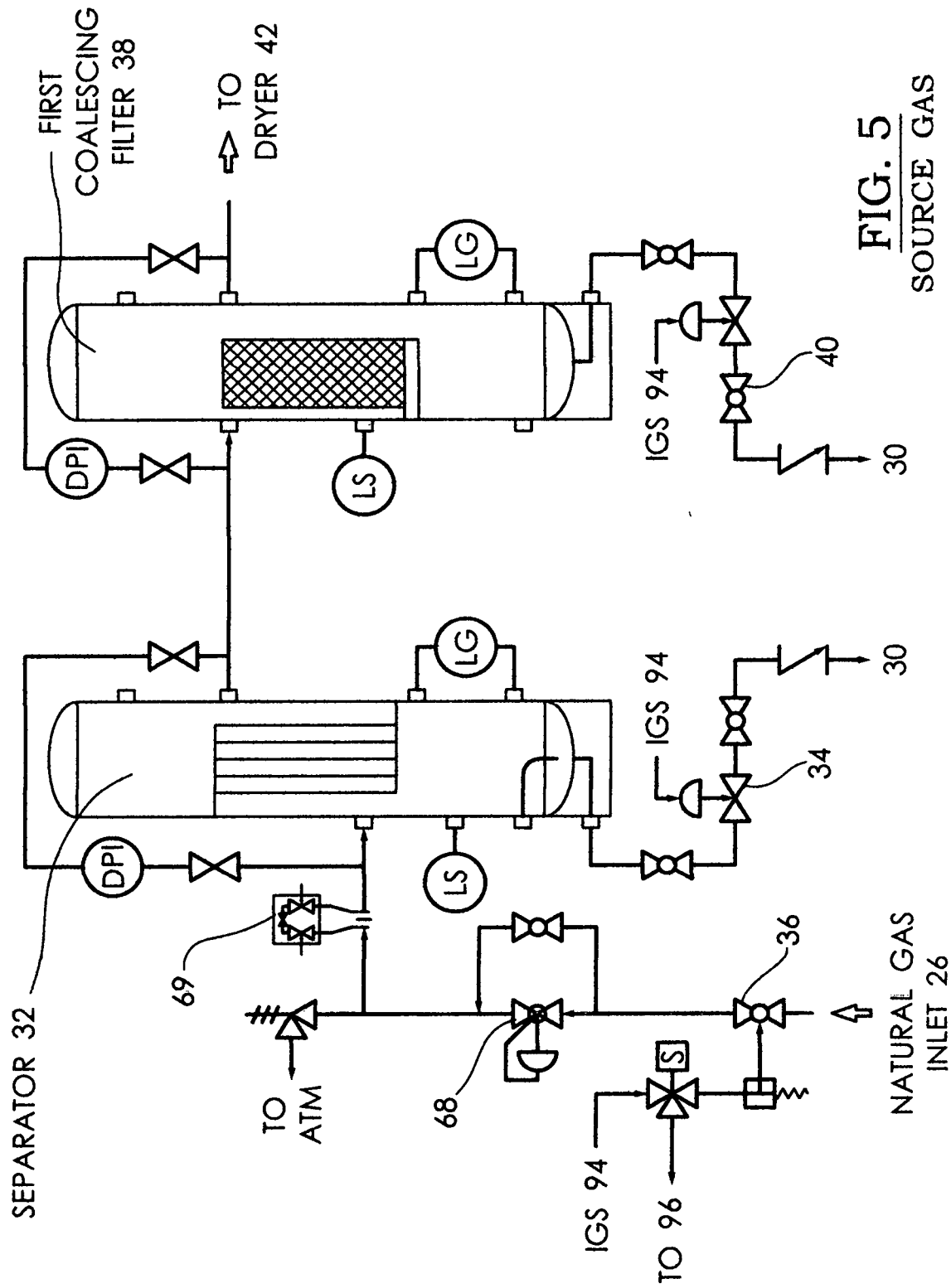
FIG. 5 is a piping and instrumentation diagram of the natural gas processing system of FIG. 1, showing the source natural gas inlet, separator, and coalescing filter.
Figure 6:
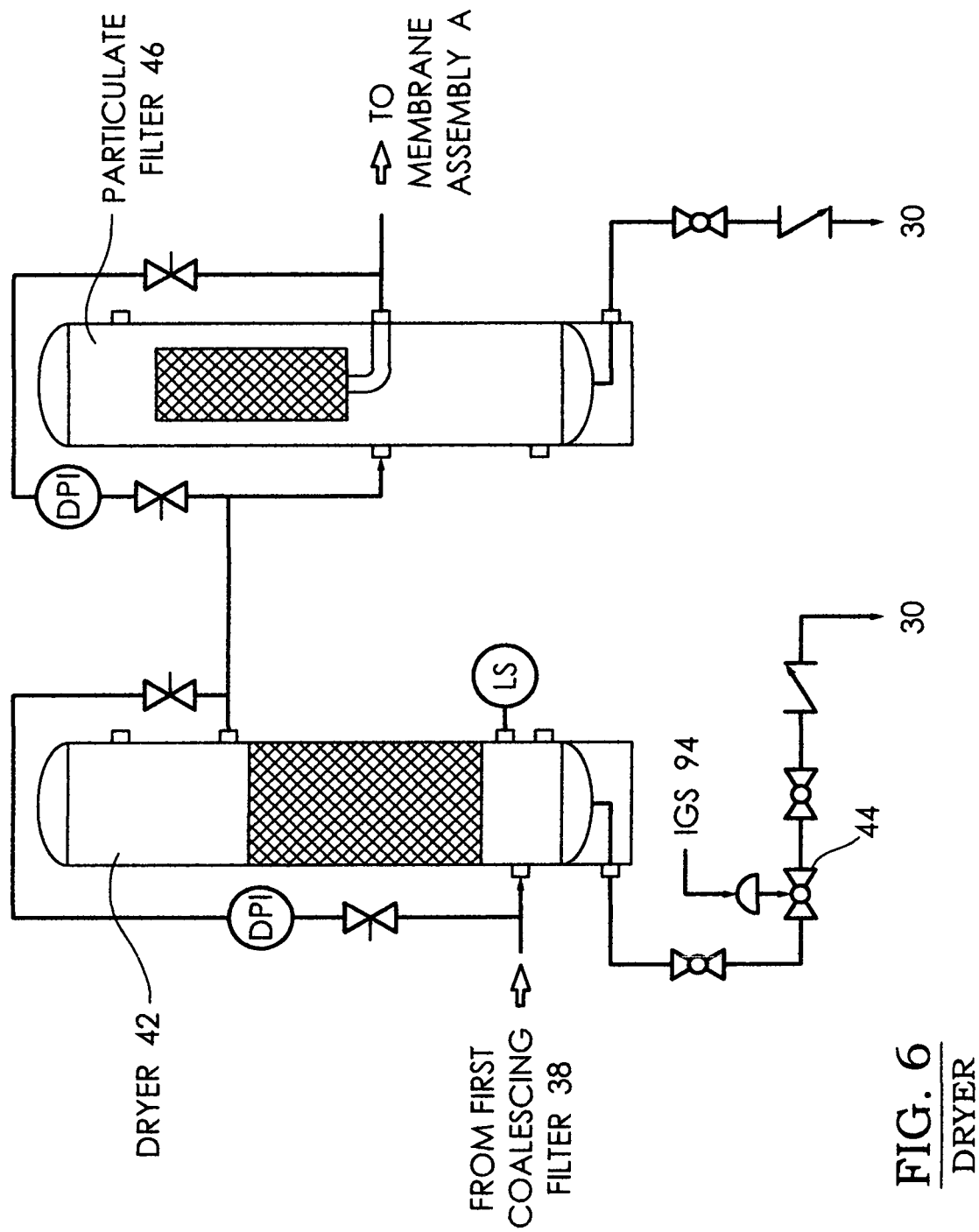
FIG. 6 is a piping and instrumentation diagram of the natural gas processing system of FIG. 1, showing the dryer and particulate filter.

It should be noted that the drawings herein are not to scale.

DETAILED DESCRIPTION

Describing now in further detail these exemplary embodiments with reference to the Figures as described above, the natural gas processing system is typically used to process natural gas sourced from a well or a pipeline. However, the source is non-limiting, and can be a truck tanker, a marine tanker, a stationary storage tank, or any source.

As used herein, a "processing assembly" or "processing system" refers to one or more devices used to condition or transform or process natural gas into another form or product.

As used herein, "natural gas" refers to raw source natural gas, or refined natural gas, or a gaseous fuel product in any stage of processing from the source to the finished product ready to ship. As used herein, "source gas" refers to raw natural gas or field gas as it comes directly from the wellhead.

As used herein, the term "process" refers to a procedure of moving or transporting a raw source natural gas, or a refined natural gas, or a gaseous fuel product, and converting the natural gas into a gaseous fuel product in any stage of processing. The "flow path" is the conduit through which the natural gas moves during the process. The natural gas moves in a "process direction" along the flow path, shown by arrows.

As used herein, a "membrane" is a film material that serves as a permselective barrier or interface between two or more natural gas phases. Separation happens due to one or more of the natural gas components in the raw source natural gas passing through the membrane more easily and quickly than the remaining components.

As used herein, "retentate" gas is a refined natural gas product comprised mostly of methane, and does not pass easily through the membrane. As used herein, "permeate" is the gas that has permeated or passed through the membrane, which includes contaminants, as well as gaseous fuel products, which are marketed.

As used herein, "pressure control valve" is a pressure regulator.

As used herein, "IGS" means instrument gas supply.

Energy companies benefit by using natural gas at the well head, rather than diesel fuel, to power engines for on-site processes such as drilling, pumping various fluids, and for electricity. This results in cost savings, worker safety, and environmental protection. This disclosure is one embodiment of the invention that conditions natural gas from the well head for use in these multi-fuel engines. Referring to the drawing FIGS. 1-4, a natural gas processing system is shown at 20. The system 20 is used in connection with a natural gas source 22 (not shown) which typically comprises, but is not limited to, a natural gas well or a natural gas pipeline. Raw source natural gas 24 (not shown) is produced by the source 22. The natural gas 24 enters the system through natural gas inlet 26. The natural gas processing system 20 comprises a mobile platform 28 that can be transported to the natural gas source 22. The mobile platform 28 is typically a trailer or a skid, but is not limited to these structures. The mobile platform 28 can be any structure capable of receiving and mounting equipment and of being transported to the site of the natural gas source 22. FIGS. 1-4 show a trailer mobile platform 28.

Turning to the drawing FIGS. 5-11, as well as FIGS. 1-4, a liquid drain 30 is juxtaposed with the mobile platform 28 for discharging liquid contaminants from the natural gas processing system 20. The liquid drain 30 is also found on major components throughout the system. All liquid drains 30 typically connect to a condensate tank (not shown) mounted off the mobile platform 28. The condensate tank is in turn drained periodically. The by-product condensate, mostly water, can also be pumped back into a liquids line if the customer utilizes one in their operation.

A separator 32 is mounted on the mobile platform 28. The separator 32 is connected in fluid communication with the natural gas source 22 and the liquid drain 30. The separator 32 is connected to the liquid drain 30 through a remotely controlled separator drain valve 34. The separator 32 removes liquid contaminant matter from the natural gas. The separator 32 allows passage of the natural gas through the separator. A source natural gas valve 36 is connected in fluid communication with the natural gas source 22 at the inlet 26, and the separator 32. The source natural gas valve 36 controls the natural gas 24 entering the separator 32.

A first coalescing filter 38 is mounted on the mobile platform 28. The first coalescing filter 38 is connected in fluid communication with the separator 32 and the liquid drain 30. The first coalescing filter 38 is connected to the liquid drain 30 through a remotely controlled first filter drain valve 40. The first coalescing filter 38 removes fluid contaminant matter from the natural gas 24. The first coalescing filter 38 allows passage of the natural gas 24 through the filter 38.

A dryer 42 is mounted on the mobile platform 28. The dryer 42 is connected in fluid communication with the first coalescing filter 38 and the liquid drain 30. The dryer 42 is connected to the liquid drain 30 through a remotely controlled dryer drain valve 44. The dryer 42 removes water vapor from the natural gas 24. The dryer 42 allows passage of the natural gas 24 through the dryer 42. The dryer 42 is preferably a deliquescent desiccant dryer, but this is to be considered non-limiting.

A particulate filter 46 is mounted on the mobile platform 28. The particulate filter 46 is connected in fluid communication with the dryer 42 and the liquid drain 30. The particulate filter 46 removes particulate matter from the natural gas 24. The particulate filter 46 allows passage of the natural gas 24 through the filter 46. The particulate filter 46, is typically equipped with pleated filter elements, but this is to be considered non-limiting.

A second coalescing filter 48 is mounted on the mobile platform 28. The second coalescing filter 48 is connected in fluid communication with the particulate filter 46 and the liquid drain 30. The second coalescing filter 48 is connected to the liquid drain 30 through a remotely controlled second filter drain valve 50. The second coalescing filter 48 removes particulate matter and fluid contaminant matter from the natural gas 24. The second coalescing filter 48 allows passage of the natural gas 24 through the filter 48. The second coalescing filter 48 typically will be a conditioning membrane two stage filtration vessel having pleated filters, but this is to be considered non-limiting.

A first membrane 52 is mounted on the mobile platform 28. The first membrane 52 is connected in fluid communication with the particulate filter 46. The first membrane 52 separates the natural gas 24 into a retentate gas 54 and a permeate gas 56. The first membrane 52 allows passage of the permeate gas 56 through the membrane 52, and restricts passage of the retentate gas 54 through the membrane 52. The particulate filter 46 can be located anywhere upstream of the first membrane 52, as it protects the membrane from contaminants. The fluid filtration and membrane performance obviate the need for any additional drying agents such as Tri-ethylene Glycol Dehydration towers, as found in prior-art systems.

A retentate valve 58 is connected in fluid communication with the first membrane 52. The retentate valve 58 controls the retentate gas 54 exiting the natural gas processing system 20 at the retentate outlet 59.

A permeate valve 60 is connected in fluid communication with the first membrane 52. The permeate valve 60 controls the permeate gas 56 exiting the natural gas processing system 20 at the permeate outlet 61.

A second membrane 62 is mounted on the mobile platform 28. The second membrane 62 is connected in fluid communication with the particulate filter 46. The second membrane 62 is also connected in parallel fluid communication with the first membrane 52. The second membrane 62 is identical to the first membrane 52. The second membrane 62 separates the natural gas 24 into the retentate gas 54 and the permeate gas 56. The second membrane 62 allows passage of the permeate gas 56 through the membrane, and restricts passage of the retentate gas 54 through the membrane. Shutoff valves are provided to isolate either the first membrane 52 or the second membrane 62. This is to allow maintenance on one membrane while the natural gas 24 is being processed by the remaining membrane.

Figure 7:
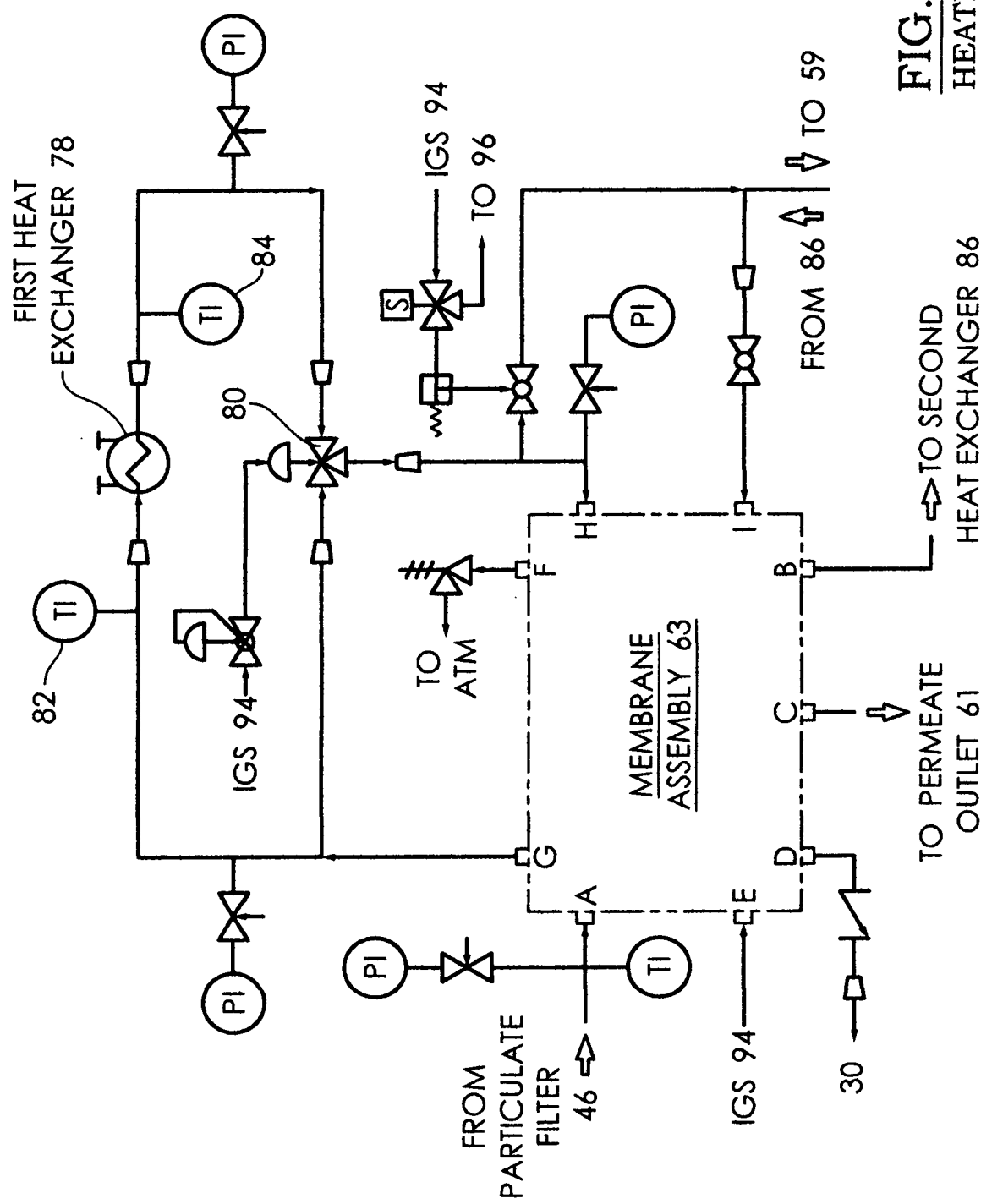
FIG. 7 is a piping and instrumentation diagram of the natural gas processing system of FIG. 1, showing the first heat exchanger and connections to the membrane assembly.

A membrane assembly 63 includes the second coalescing filter 48, the first membrane 52, and the second membrane 62. Although it has no separate enclosure, the membrane assembly 63, as shown in FIG. 7, is a subsystem of the natural gas processing system 20. The membrane assembly 63 is depicted with letter-designated connections for clarity. Connection A is incoming natural gas 24 from the particulate filter 46. Natural gas 24 passes through the second coalescing filter 48 and leaves the assembly at connection G. The natural gas 24 then passes through the temperature control valve 80 and the first heat exchanger 78. Gas then re-enters the membrane assembly 63 at connection H. The natural gas 24 passes through the first 52 and second 62 membranes. Permeate gas 56 leaves the assembly at connection C and flows toward the permeate outlet. Retentate gas 54 leaves connection B and enters the second heat exchanger 86. Retentate gas 54 also leaves connection I and flows toward the retentate outlet 59. Connection D goes to the liquid drain 30. Connection E is to the instrument gas supply 94, as required. Connection F is a vent to atmosphere.

A thermoelectric generator 64 is mounted on the mobile platform 28. The thermoelectric generator 64 is powered by the natural gas 24, and supplies process electricity to the processing system 20. Retentate gas 54 is supplied to the thermoelectric generator 64 at approximately 1695 SCFD and 15-25 PSIG.

A process control 66 is provided which controls the natural gas processing system 20. The process control 66 is operatively connected to the source natural gas valve 36, the retentate valve 58, the permeate valve 60, and the thermoelectric generator 64. The process control 66 controls the plurality of temperature, pressure, and flow measuring instruments operatively connected to the process control. The remotely controlled valves and operatively connected instruments are controlled by the process control.

The process control 66 includes at least a central processor, a memory, and input and output connections. Input signals are received from instruments throughout the system. Input signals comprise temperature, pressure, and flow at various critical points of the system. Input signals further comprise electrical voltage and current. Output signals are sent to pressure control valves, temperature control valves, and emergency shutdown systems. Shutdown can be initiated from the mobile platform 28 or from an outside source. Control logic is programmed to monitor the entire process and is able to provide operator ease of use and real time process status updates.

At every step in the gas conditioning system, level sensors on vessels monitor the amount of liquid contaminants that have accumulated. When a predetermined level is reached, the sensors send data to the process control 66, which will then activate the control valves to drain the liquid contaminants to a produced fluids tank (not shown), which can be onboard or off the mobile platform 28.

Additional level sensors are provided on the separator 32 and the first coalescing filter 38 to sense unusually high levels of liquid in these vessels. This will signal the process control 66 that an emergency shutdown is required. The process control 66 will activate a control valve to shut off natural gas 24 flow through the system 20. This will prevent natural gas 24 and liquid contaminants from entering the separator 32 and the first coalescing filter 38. Contaminants can then be removed and the process restarted.

An inlet pressure control valve 68 is connected in fluid communication with the natural gas source 22 and the separator 32. The inlet pressure control valve 68 is operatively connected to the process control 66 for controlling a pressure of the natural gas 24 entering the separator 32. An inlet flowmeter 69 is provided upstream of the separator 32. The inlet flowmeter 69 is operatively connected to the process control 66 to monitor system parameters.

Figure 8:
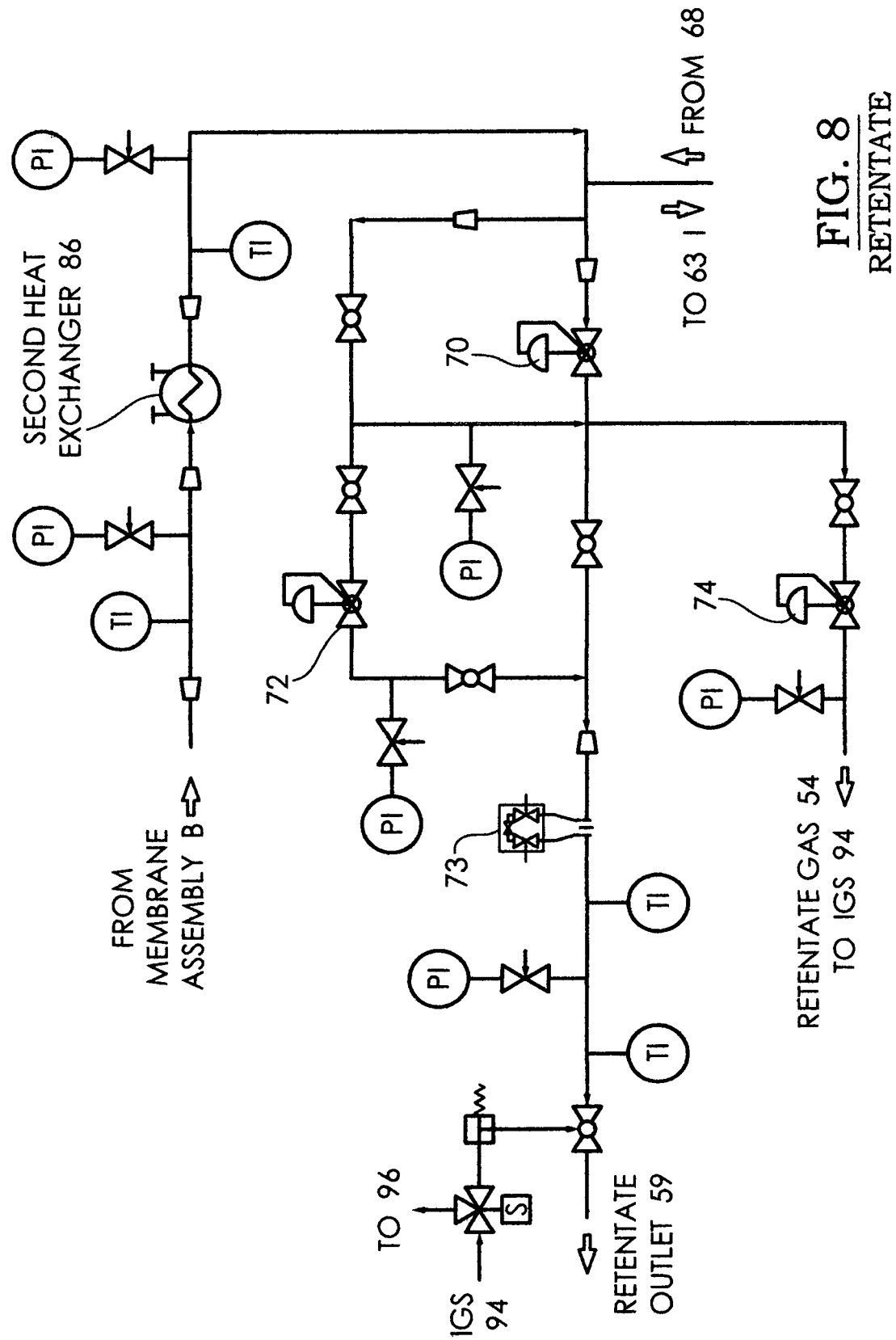
FIG. 8 is a piping and instrumentation diagram of the natural gas processing system of FIG. 1, showing the second heat exchanger and retentate gas outlet.
Figure 9:
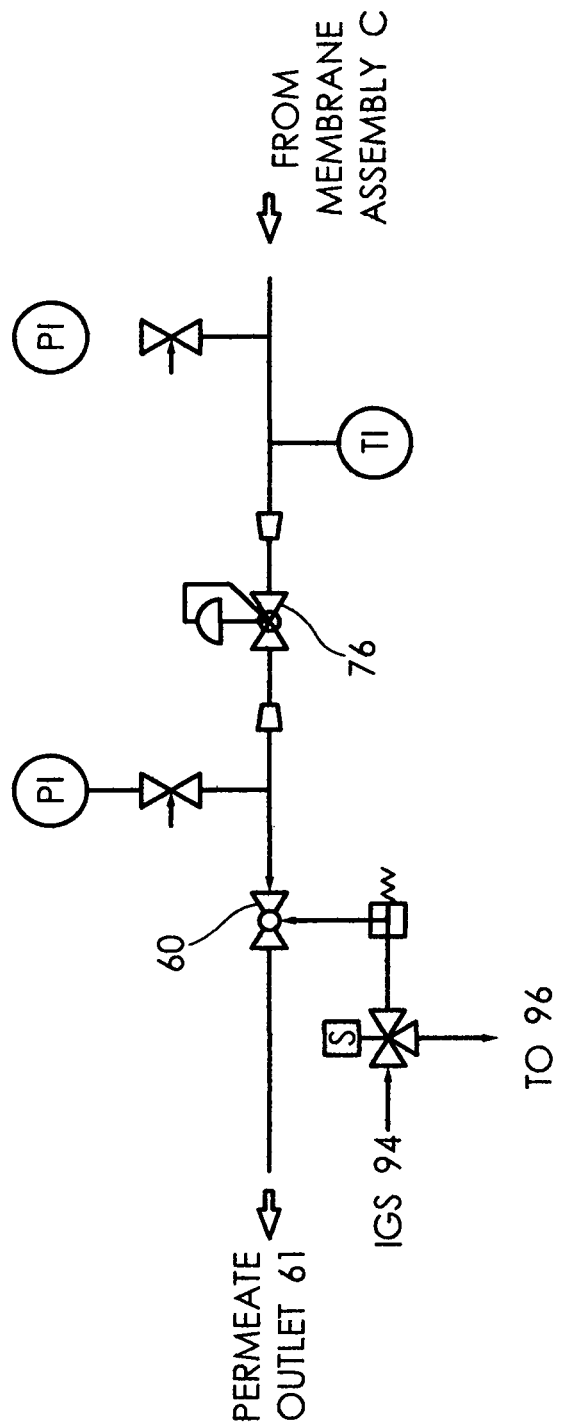
FIG. 9 is a piping and instrumentation diagram of the natural gas processing system of FIG. 1, showing the permeate gas outlet.
Figure 10:
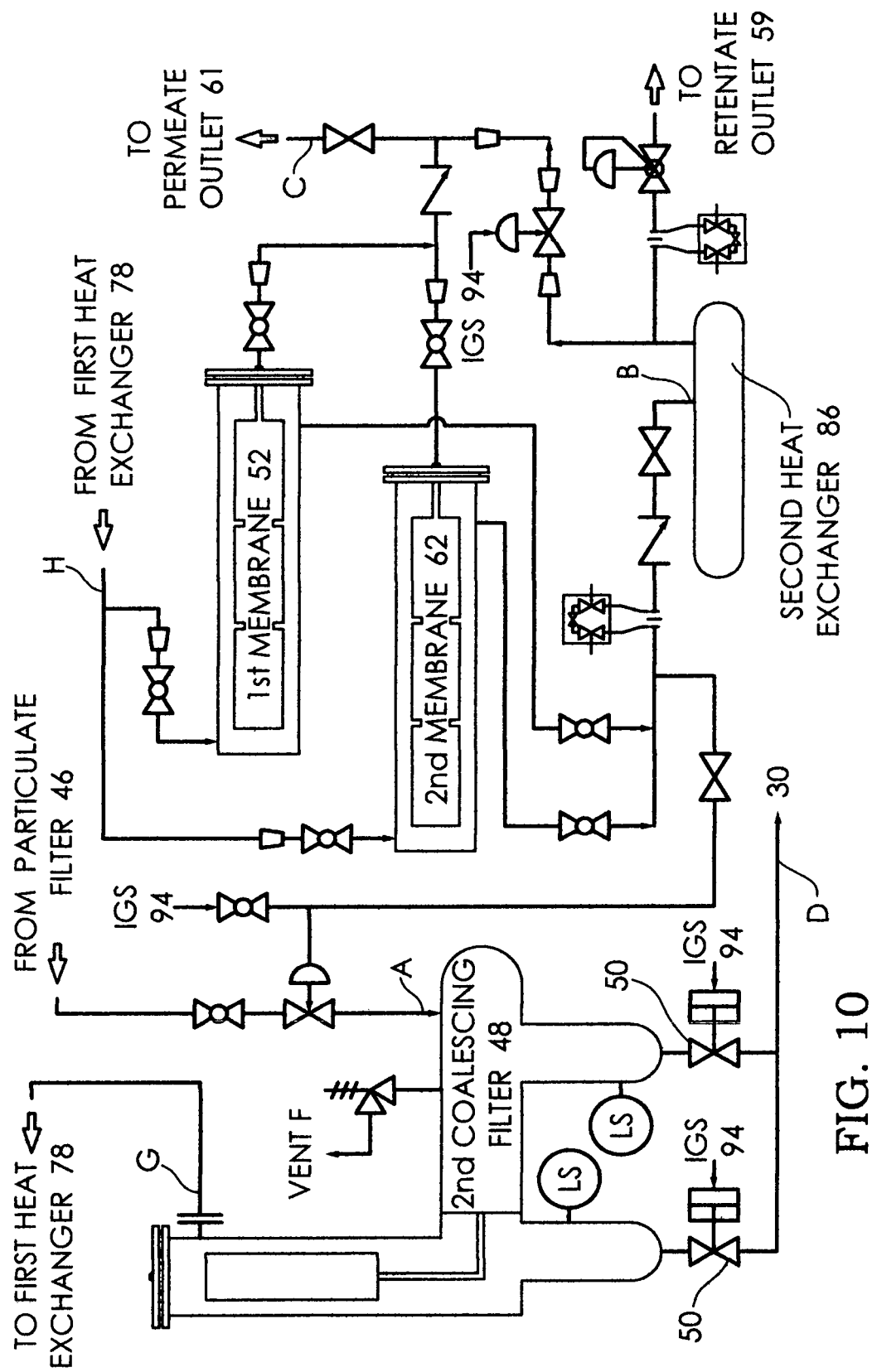
FIG. 10 is a piping and instrumentation diagram of the natural gas processing system of FIG. 1, showing the membrane assembly.
Figure 11:
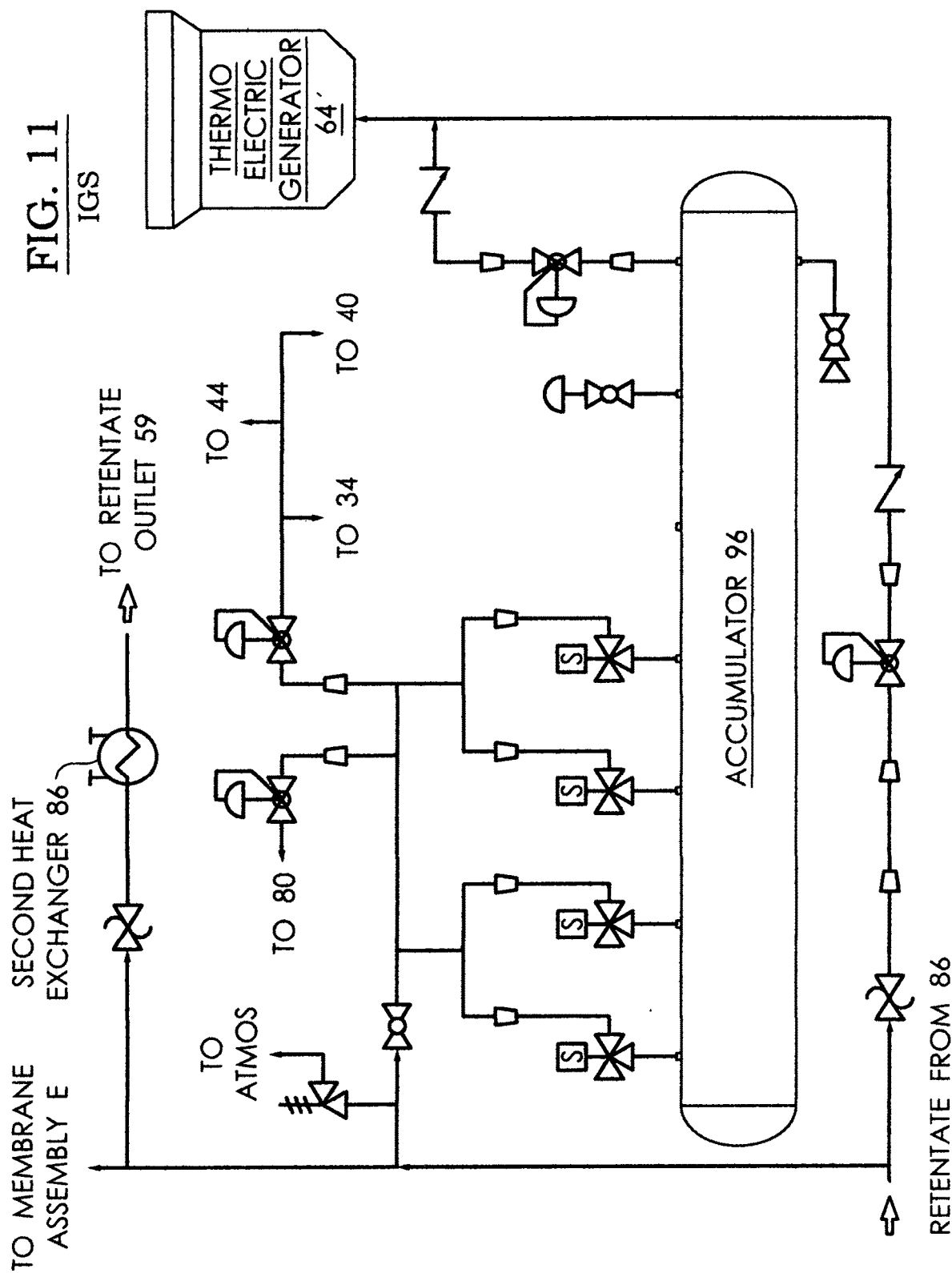
FIG. 11 is a piping and instrumentation diagram of the natural gas processing system of FIG. 1, showing the instrument gas system and thermoelectric generator.
Figure 12:
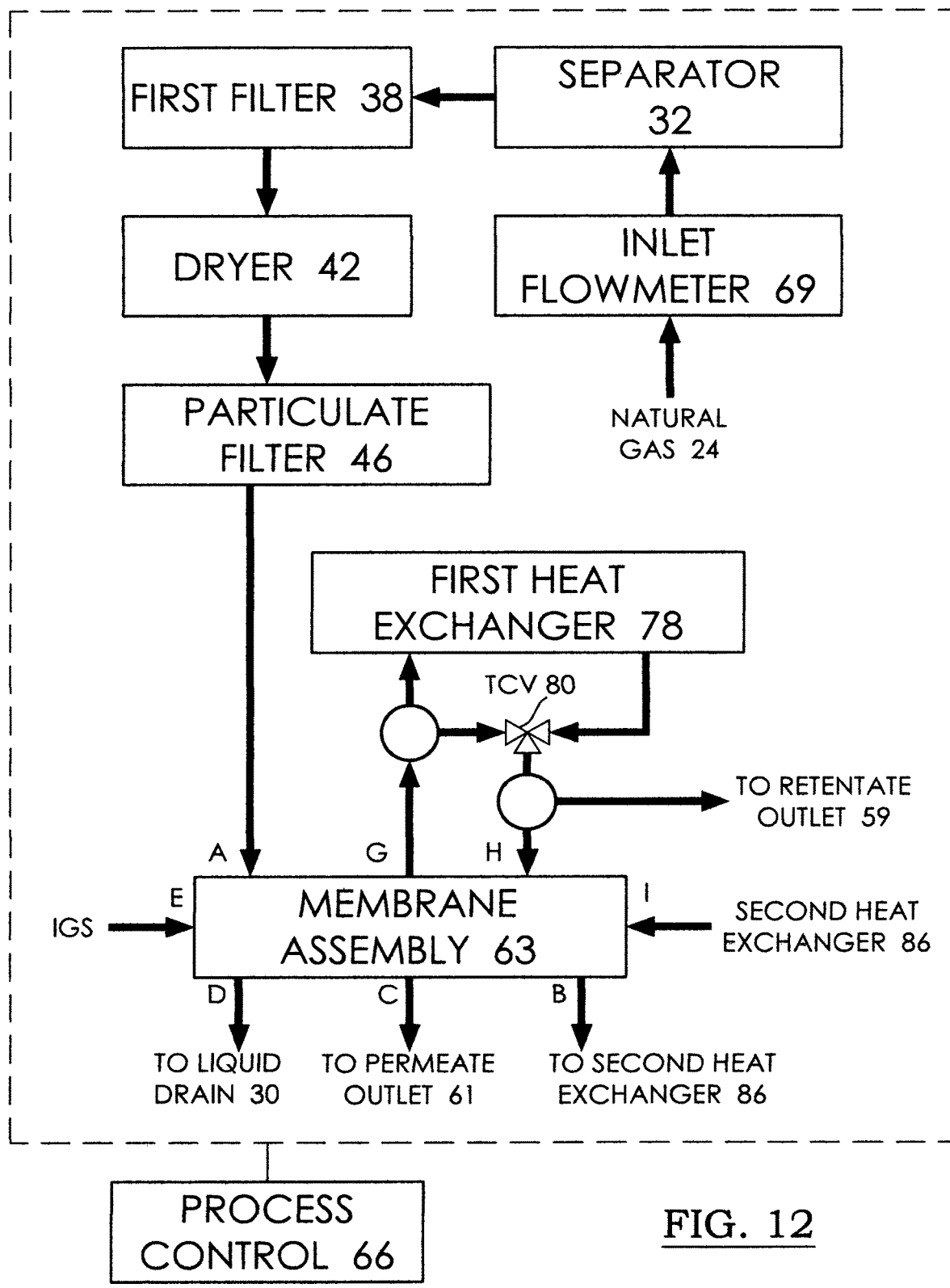
FIG. 12 is a block diagram of the natural gas processing system of FIG. 1, showing the gas flow from the inlet to the membrane assembly.
Figure 13:
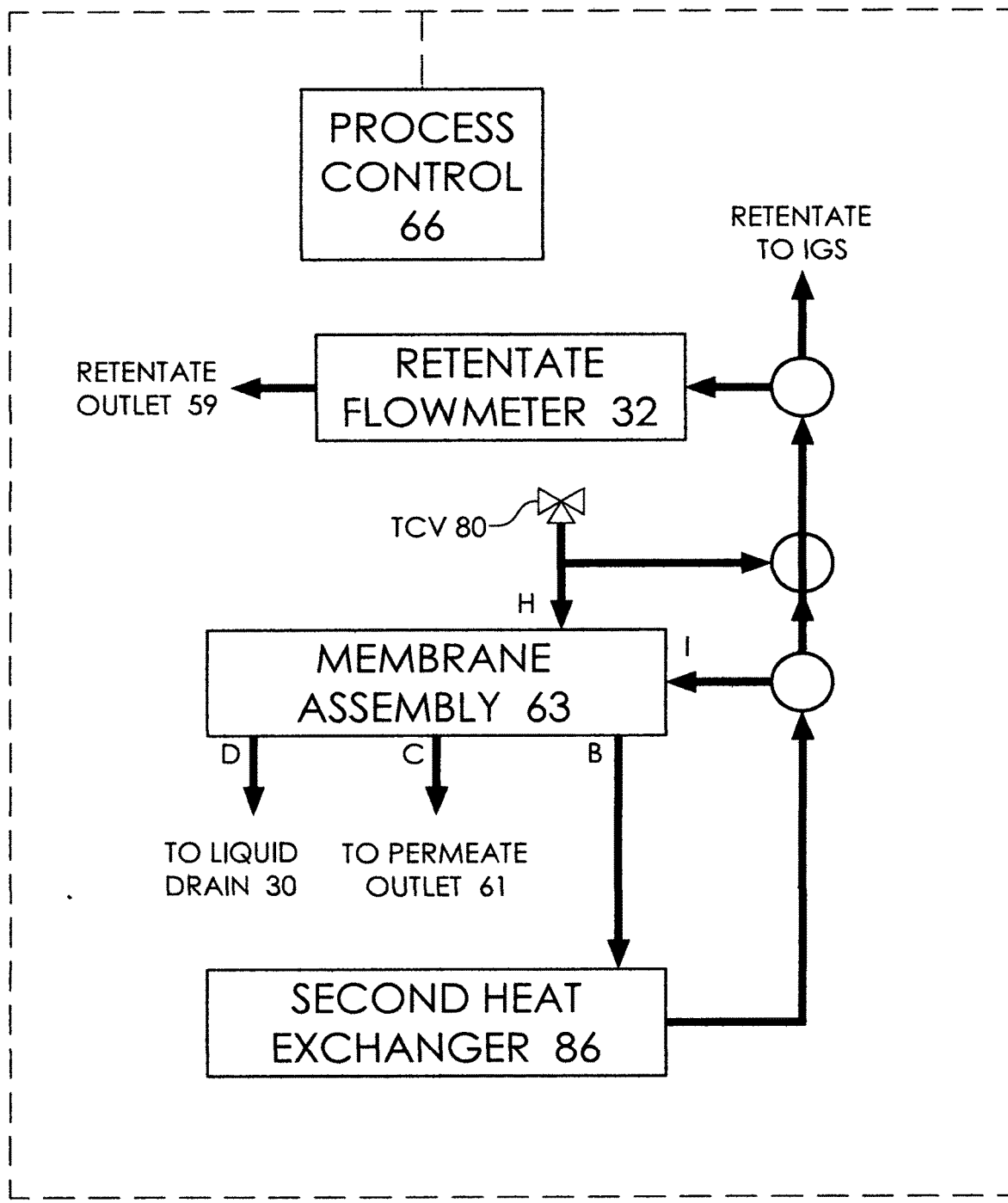
FIG. 13 is a block diagram of the natural gas processing system of FIG. 1, showing the gas flow from the membrane assembly to the retentate outlet.
Figure 14:
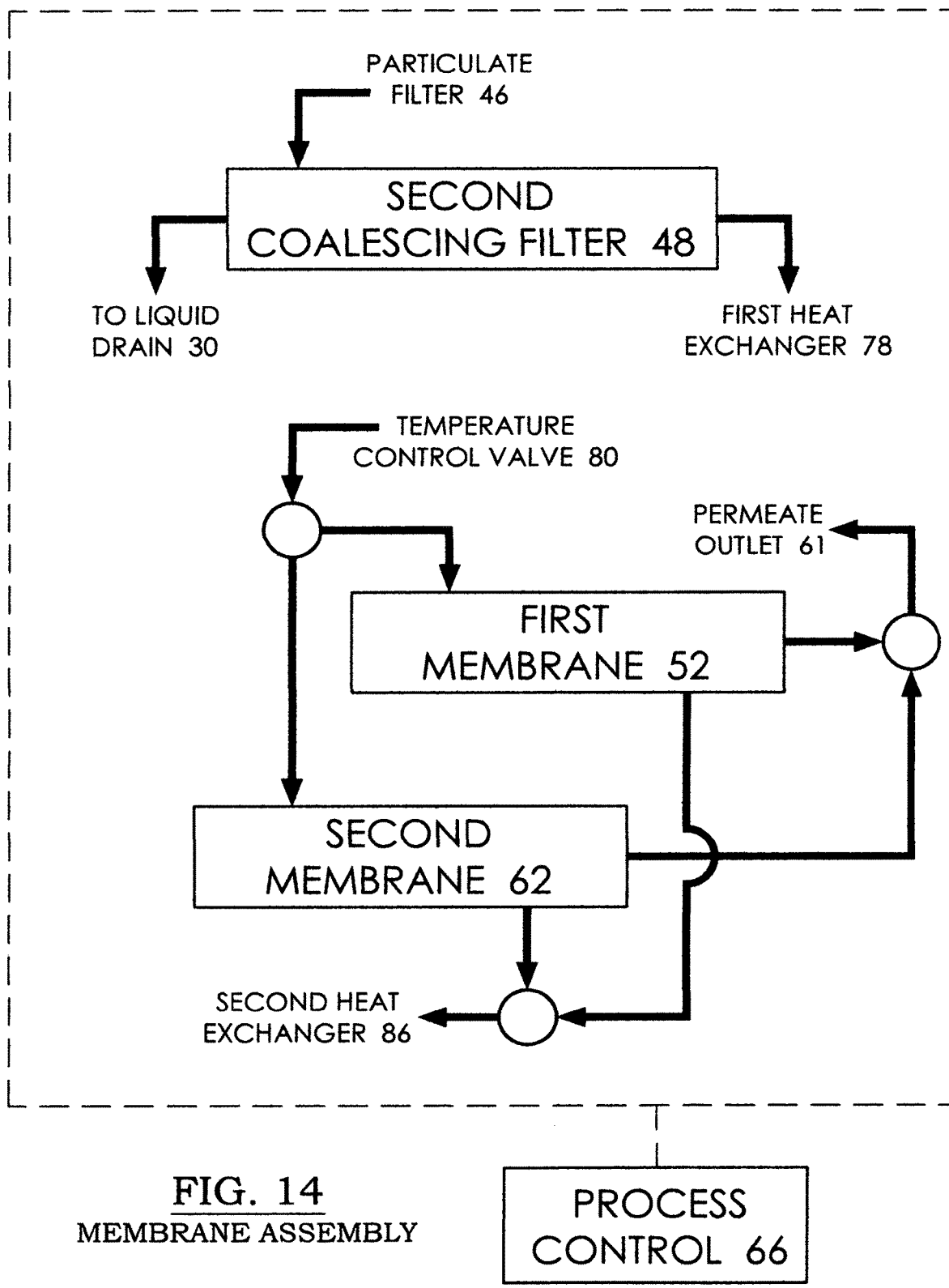
FIG. 14 is a block diagram of the natural gas processing system of FIG. 1, showing the membrane assembly.

As shown in FIG. 8, at least one retentate pressure control valve 70 is connected in fluid communication with the first membrane 52. The retentate pressure control valve 70 is downstream of the first membrane 52, and operatively connected to the process control 66. The retentate pressure control valve 70 typically maintains a pressure of the retentate gas 54 at the retentate outlet 59 within a range of 300-750 PSIG.

A retentate bypass control valve 72 is connected in parallel fluid communication with the retentate pressure control valve 70. The retentate bypass control valve 72 typically is set to regulate pressure of the retentate gas 54 within a range of 100-245 PSIG, Shutoff valves are provided to direct the flow through either control valve 70 or bypass control valve 72, depending upon system requirements. A retentate flowmeter 73 is provided between the retentate pressure control valve 70 and the retentate valve 58 and the retentate outlet 59. The retentate flowmeter 73 is operatively connected to the process control 66 to monitor system parameters.

A permeate gas outlet 61 allows the permeate gas 56 to exit the natural gas processing system 20. The permeate gas 56 can be used to fuel engines for auxiliary equipment, as described above. The permeate gas 56 remains in a gaseous form and is typically injected back into the pipeline from which it was sourced in its raw form. This eliminates the complications of storing gas or liquid permeate onsite or removing via truck. There is no longer any justification for wasteful flaring of gas. A permeate pressure control valve 76 is connected in fluid communication with the first membrane 52 downstream of the first membrane 52. The permeate pressure control valve 76 is operatively connected to the process control 66, and controls a pressure of the permeate gas 56 at the permeate outlet 61.

A first heat exchanger 78 is mounted on the mobile platform 28. The first heat exchanger 78 is connected in fluid communication with the first membrane 52 upstream of the first membrane. The first heat exchanger 78 changes a temperature of the natural gas 24 entering the first membrane 52.

A temperature control valve 80 is connected in fluid communication with the first heat exchanger 78 and the first membrane 52. The temperature control valve 80 is operatively connected to the process control 66. The temperature control valve 80 proportionately divides the flow of the natural gas 24 between the first heat exchanger 78 and the first membrane 52 in proportion to the temperature of the natural gas entering the temperature control valve 80. A first temperature sensor 82 upstream of the first heat exchanger 78 and the first membrane 52 determines the temperature of the natural gas 24 at that point. The sensor signal is sent to the process control 66, which in turn adjusts the temperature control valve 80 to divert more flow or less flow to the first heat exchanger 78. The balance of the flow bypasses the first heat exchanger 78. In this manner, the temperature of the natural gas 24 entering the first membrane 52 is thereby controlled within the limits of 80F-140F. Preferably, the natural gas enters the membrane at 120F, which is the optimal pre-membrane temperature for system efficiency. A second temperature sensor 84 downstream of the first heat exchanger 78 measures temperature gain.

A second heat exchanger 86 is mounted on the mobile platform 28. The second heat exchanger 86 is connected in fluid communication with the first membrane 52 downstream of the first membrane. The second heat exchanger 86 changes a temperature of the retentate gas 54 downstream of the first membrane to compensate for heat lost in the process piping. The temperature of retentate gas 54 exiting the natural gas processing system 20 will depend upon how the customers operations and manifold piping system is set up as well as ambient temperature. The retentate gas 54 is used to power auxiliary equipment such as off-platform compressors, pumps, drills, etc. The engines driving the equipment require fuel gas at approximately 70-90 F. Thus, the temperature of retentate gas 54 typically is adjusted to within a range of approximately 50-120 F at the retentate outlet 59. The first heat exchanger 78 and the second heat exchanger 86 are both preferably installed in a single heat exchanger vessel 79. However, this configuration is to be considered non-limiting.

The temperature of retentate gas 54 is controlled downstream of the first membrane 52 and upstream of the retentate pressure control valve 70. A third temperature sensor 88 upstream of the second heat exchanger 86 and a fourth temperature sensor 90 downstream of the second heat exchanger 86 measure temperature gain. The third 88 and fourth 90 temperature sensors are operatively connected to the process control 66. A glycol bath heater transfers heat to the first heat exchanger 78 and the second heat exchanger 86. The glycol bath heater 87 is controlled by the process control 66 using data input from the temperature sensors 88, 90. A fifth temperature sensor 92 before the retentate outlet 59 sends additional data to the process control 66. The glycol bath heater 87 is natural gas fired from two fuel sources: pre-membrane source natural gas 24, and retentate gas 54. The glycol bath heater 87 is equipped with a temperature control valve and a logic controlled burner management system. The glycol bath heater 87, is well known to those skilled in the art, and is not detailed herein. The heat exchangers 78, 86, and temperature control valve 80 are an improvement over prior art, in that the temperatures of both the source natural gas 24 and the retentate gas 54 are controlled within predetermined limits.

An instrument gas supply, or IGS 94, is provided to supply pneumatic gas pressure to valves and instruments. The IGS 94 obviates the need for an air compressor by using natural gas 24 already available from the natural gas source 22. The IGS 94 includes an instrument gas accumulator 96, connected in fluid communication with the first membrane 52 to supply the accumulator 96 with pressurized retentate gas 54. The accumulator 96 is connected in fluid communication with the control valves to supply the control valves with pneumatic retentate gas pressure. The accumulator 96 is also connected to the thermoelectric generator 64 to supply retentate gas fuel to the thermoelectric generator 64. The accumulator 96 stores and releases retentate gas 54 upon demand.

An IGS pressure control valve 74 is connected in fluid communication with the first membrane 52, downstream of the first membrane 52, and is operatively connected to the process control 66. The IGS pressure control valve 74 typically maintains a pressure of the natural gas 24 into the IGS 94 at about 110 PSIG.

The natural gas processing system 20 is adapted to process the source natural gas 24 having a pressure range of from atmospheric pressure to 1440 PSIG. The predetermined pressure of the natural gas 24 leaving the inlet pressure control valve 68 and entering the separator 32 is approximately 938 PSIG. This can vary with ambient air temperature and pressure. This can also vary with customer piping arrangement. For example, if the piping exhibits high pressure drop, the predetermined pressure setpoint can be adjusted upward to ensure sufficient pressure entering the system. Those skilled in the art will selectively adjust the predetermined pressure according to conditions at the site. The process control 66 will automatically adjust the valve arrangement according to the pressure of the natural gas 24 entering the natural gas processing system 20. The natural gas processing system 20 will thus process the source natural gas 24 without the need for additional gas compression, as with prior-art systems.

An automated emergency shutdown, activated by the process control 66, is connected to gas detection sensors located near the glycol bath heater 87 and the thermoelectric generator 64. The emergency shutdown system can shut down the natural gas processing system 20 when predetermined gas leakage levels are reached, by means of the process control 66. Personnel can manually shut down the natural gas processing system 20 with any one of four emergency stop panels (not shown) that are located on the mobile platform 28. They can also manually shutdown the system by a 50 foot cable wired emergency stop button (not shown) external to the mobile platform 28. Such manual shutdown controls are well known in the art.

The source natural gas 24 parameters at the natural gas inlet 26 are as follows. The natural gas processing system 20 is adapted to process the source natural gas 24 having a temperature range from 30° F. to 100° F. The BTU composition should preferably range of from 1,100 BTU to 1,400 BTU. The source natural gas 24 pressure can range up to 1,440 PSIG. The source natural gas 24 saturation levels are at typically at dewpoint.

Sensors (not shown) for sampling composition of the natural gas 24 are located on the mobile platform 28. The sensors are operatively connected to the process control 66 to analyze the gas composition continuously.

Vent connections with associated piping are found on major components throughout the system. All vents typically bleed gases to the atmosphere through a relief valve.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A natural gas processing system for use in connection with a natural gas source and raw source natural gas produced by the source, the natural gas processing system comprising:
   a mobile platform adapted for being transported to the natural gas source;
   a liquid drain juxtaposed with the mobile platform for discharging liquid contaminants from the natural gas processing system;
   a source natural gas valve connected in fluid communication with the natural gas source for controlling the source natural gas entering the natural gas processing system;
   a first coalescing filter mounted on the mobile platform, the first coalescing filter being connected in fluid communication with the source natural gas valve and the liquid drain, the first coalescing filter being connected to the liquid drain through a remotely controlled first filter drain valve, the first coalescing filter being adapted for removing fluid contaminant matter from the natural gas, the first coalescing filter being adapted for allowing passage of the natural gas therethrough;
   a dryer mounted on the mobile platform, the dryer being connected in fluid communication with the first coalescing filter and the liquid drain, the dryer being connected to the liquid drain through a remotely controlled dryer drain valve, the dryer being adapted for removing water vapor from the natural gas, the dryer being adapted for allowing passage of the natural gas therethrough;
   a particulate filter mounted on the mobile platform, the particulate filter being connected in fluid communication with the dryer and the liquid drain, the particulate filter being adapted for removing particulate matter from the natural gas, the particulate filter being adapted for allowing passage of the natural gas therethrough;
   a first membrane mounted on the mobile platform, the first membrane being connected in fluid communication with the natural gas source, the first membrane being adapted for separating the natural gas into a retentate gas and a permeate gas, the first membrane being adapted for allowing passage of the permeate gas therethrough, and restricting passage of the retentate gas therethrough;
   a retentate valve connected in fluid communication with the first membrane for controlling the retentate gas exiting the natural gas processing system; and
   a permeate valve connected in fluid communication with the first membrane for controlling the permeate gas exiting the natural gas processing system.

2. The natural gas processing system of claim 1, further comprising a separator mounted on the mobile platform, the separator being connected in fluid communication with the natural gas source and the liquid drain, the separator being connected to the liquid drain through a remotely controlled separator drain valve, the separator being adapted for removing liquid contaminant matter from the natural gas, the separator being adapted for allowing passage of the natural gas therethrough.

3. The natural gas processing system of claim 1, further comprising a second coalescing filter mounted on the mobile platform, the second coalescing filter being connected in fluid communication with the particulate filter and the liquid drain, the second coalescing filter being connected to the liquid drain through a remotely controlled second filter drain valve, the second coalescing filter being adapted for removing particulate matter and fluid contaminant matter from the natural gas, the second coalescing filter being adapted for allowing passage of the natural gas therethrough.

4. The natural gas processing system of claim 1, further comprising a second membrane mounted on the mobile platform, the second membrane being connected in fluid communication with the natural gas source and in parallel fluid communication with the first membrane, the second membrane being adapted for separating the natural gas into a retentate gas and a permeate gas, the second membrane being adapted for allowing passage of the permeate gas therethrough, and restricting passage of the retentate gas therethrough.

5. The natural gas processing system of claim 1, further comprising a thermoelectric generator mounted on the mobile platform for supplying process electricity, the thermoelectric generator being powered by the natural gas.

6. The natural gas processing system of claim 5, further comprising:
   a process control operatively connected to the source natural gas valve, the retentate valve, the permeate valve, and the thermoelectric generator, for controlling the natural gas processing system;
   a plurality of temperature measuring instruments operatively connected to the process control;
   a plurality of pressure measuring instruments operatively connected to the process control; and a plurality of flow measuring instruments operatively connected to the process control; wherein
the remotely controlled valves and operatively connected instruments are controlled by the process control.

7. The natural gas processing system of claim 5, further comprising an instrument gas supply, including an instrument gas accumulator, the accumulator being connected in fluid communication with the first membrane so as to supply the accumulator with pressurized retentate gas for operating instruments and control valves, the accumulator being adapted for storing and releasing retentate gas upon demand, the accumulator being connected in fluid communication with the control valves so as to supply the control valves with pressurized retentate gas, the instrument gas supply being connected to the thermoelectric generator so as to supply retentate gas fuel to the thermoelectric generator.

8. The natural gas processing system of claim 6, further comprising an inlet pressure control valve connected in fluid communication with the natural gas source, the inlet pressure control valve being operatively connected to the process control for controlling a pressure of the natural gas entering the natural gas processing system.

9. The natural gas processing system of claim 8, further comprising at least one retentate pressure control valve connected in fluid communication with the first membrane, the retentate pressure control valve being downstream of the first membrane and operatively connected to the process control for controlling a pressure of the natural gas downstream of the first membrane.

10. The natural gas processing system of claim 9, further comprising a permeate pressure control valve connected in fluid communication with the first membrane, the permeate pressure control valve being downstream of the first membrane and operatively connected to the process control for controlling a pressure of the natural gas downstream of the first membrane.

11. The natural gas processing system of claim 10, further comprising:
a first heat exchanger mounted on the mobile platform, the first heat exchanger being connected in fluid communication with the first membrane, the first heat exchanger being upstream of the first membrane, for changing a temperature of the natural gas entering the first membrane; and
a temperature control valve connected in fluid communication with the first heat exchanger and the first membrane, the temperature control valve being operatively connected to the process control for controlling the temperature of the natural gas entering the first membrane.

12. The natural gas processing system of claim 11, wherein the temperature control valve is adapted to proportionately divide the flow of the natural gas between the first heat exchanger and the first membrane in proportion to the temperature of the natural gas entering the temperature control valve, thereby controlling the temperature of the natural gas entering the first membrane.

13. The natural gas processing system of claim 12, further comprising a second heat exchanger mounted on the mobile platform, the second heat exchanger being connected in fluid communication with the first membrane for changing a temperature of the natural gas downstream of the first membrane.

14. The natural gas processing system of claim 1, wherein the processing system is adapted to process the source natural gas having the properties of:

a pressure range of from 50 PSIG to 1200 PSIG;
a temperature range of from 40° F. to 120° F.; and
a BTU composition range from 1,100 BTU to 1,400 BTU; and wherein
the source natural gas saturation levels are at dewpoint.

15. The natural gas processing system of claim 14, wherein the processing system is adapted to process the source natural gas having the properties of:
a pressure range of from atmospheric pressure to 2400 PSIG;
a temperature range of from 30° F. to 180° F.; and
a BTU composition range from 950 BTU to 1800 BTU; and wherein
the source natural gas saturation levels are at dewpoint.

16. A natural gas processing system for use in connection with a natural gas source and raw source natural gas produced by the source, the natural gas processing system comprising:
a mobile platform adapted for being transported to the natural gas source;
a liquid drain juxtaposed with the mobile platform for discharging liquid contaminants from the natural gas processing system;
a separator mounted on the mobile platform, the separator being connected in fluid communication with the natural gas source and the liquid drain, the separator being connected to the liquid drain through a remotely controlled separator drain valve, the separator being adapted for removing liquid contaminant matter from the natural gas, the separator being adapted for allowing passage of the natural gas therethrough;
a source natural gas valve connected in fluid communication with the natural gas source and the separator for controlling the source natural gas entering the separator;
a first coalescing filter mounted on the mobile platform, the first coalescing filter being connected in fluid communication with the separator and the liquid drain, the first coalescing filter being connected to the liquid drain through a remotely controlled first filter drain valve, the first coalescing filter being adapted for removing fluid contaminant matter from the natural gas, the first coalescing filter being adapted for allowing passage of the natural gas therethrough;
a dryer mounted on the mobile platform, the dryer being connected in fluid communication with the coalescing filter and the liquid drain, the dryer being connected to the liquid drain through a remotely controlled dryer drain valve, the dryer being adapted for removing water vapor from the natural gas, the dryer being adapted for allowing passage of the natural gas therethrough;
a particulate filter mounted on the mobile platform, the particulate filter being connected in fluid communication with the dryer and the liquid drain, the particulate filter being adapted for removing particulate matter from the natural gas, the particulate filter being adapted for allowing passage of the natural gas therethrough;
a second coalescing filter mounted on the mobile platform, the second coalescing filter being connected in fluid communication with the particulate filter and the liquid drain, the second coalescing filter being connected to the liquid drain through a remotely controlled second filter drain valve, the second coalescing filter being adapted for removing particulate matter and fluid contaminant matter from the natural gas, the second coalescing filter being adapted for allowing passage of the natural gas therethrough;

a first membrane mounted on the mobile platform, the first membrane being connected in fluid communication with the particulate filter, the first membrane being adapted for separating the natural gas into a retentate gas and a permeate gas, the first membrane being adapted for allowing passage of the permeate gas therethrough, and restricting passage of the retentate gas therethrough;

a retentate valve connected in fluid communication with the first membrane for controlling the retentate gas exiting the natural gas processing system; and a permeate valve connected in fluid communication with the first membrane for controlling the permeate gas exiting the natural gas processing system.

17. The natural gas processing system of claim 16, further comprising a second membrane mounted on the mobile platform, the second membrane being connected in fluid communication with the particulate filter and in parallel fluid communication with the first membrane, the second membrane being adapted for separating the natural gas into a retentate gas and a permeate gas, the second membrane being adapted for allowing passage of the permeate gas therethrough, and restricting passage of the retentate gas therethrough.

18. The natural gas processing system of claim 16, further comprising a thermoelectric generator mounted on the mobile platform for supplying process electricity, the thermoelectric generator being powered by the natural gas.

19. The natural gas processing system of claim 18, further comprising:
a process control operatively connected to the source natural gas valve, the retentate valve, the permeate valve, and the thermoelectric generator, for controlling the natural gas processing system;
a plurality of temperature measuring instruments operatively connected to the process control;
a plurality of pressure measuring instruments operatively connected to the process control; and
a plurality of flow measuring instruments operatively connected to the process control; wherein
the remotely controlled valves and operatively connected instruments are controlled by the process control.

20. The natural gas processing system of claim 19, further comprising an inlet pressure control valve connected in fluid communication with the natural gas source and the separator, the inlet pressure control valve being operatively connected to the process control for controlling a pressure of the natural gas entering the separator.

21. The natural gas processing system of claim 19, further comprising at least one retentate pressure control valve connected in fluid communication with the first membrane, the retentate pressure control valve being downstream of the first membrane and operatively connected to the process control for controlling a pressure of the natural gas downstream of the first membrane.

22. The natural gas processing system of claim 19, further comprising a permeate pressure control valve connected in fluid communication with the first membrane, the permeate pressure control valve being downstream of the first membrane and operatively connected to the process control for controlling a pressure of the natural gas downstream of the first membrane.

23. The natural gas processing system of claim 19, further comprising:
a first heat exchanger mounted on the mobile platform, the first heat exchanger being connected in fluid communication with the first membrane, the first heat exchanger being upstream of the first membrane, for changing a temperature of the natural gas entering the first membrane; and
a temperature control valve connected in fluid communication with the first heat exchanger and the first membrane, the temperature control valve being operatively connected to the process control for controlling the temperature of the natural gas entering the first membrane.

24. The natural gas processing system of claim 23, wherein the temperature control valve is adapted to proportionately divide the flow of the natural gas between the first heat exchanger and the first membrane in proportion to the temperature of the natural gas entering the temperature control valve, thereby controlling the temperature of the natural gas entering the first membrane.

25. The natural gas processing system of claim 24, further comprising a second heat exchanger mounted on the mobile platform, the second heat exchanger being connected in fluid communication with the first membrane for changing a temperature of the natural gas downstream of the first membrane.

26. The natural gas processing system of claim 19, further comprising an instrument gas supply, including an instrument gas accumulator, the accumulator being connected in fluid communication with the first membrane so as to supply the accumulator with pressurized retentate gas, the accumulator being connected in fluid communication with the control valves so as to supply the control valves with pneumatic retentate gas pressure, the accumulator being connected to the thermoelectric generator so as to supply retentate gas fuel to the thermoelectric generator, the accumulator being adapted for storing and releasing retentate gas upon demand.

27. A method for processing natural gas, for use in connection with a natural gas source and raw source natural gas produced by the source, the method comprising:
providing a mobile platform and adapting the mobile platform for transporting to the natural gas source;
mounting a first coalescing filter on the mobile platform, connecting a source natural gas valve in fluid communication with the first coalescing filter and the natural gas source, controlling the source natural gas entering the first coalescing filter with the natural gas valve, and allowing passage of the natural gas through the first coalescing filter;
removing fluid contaminant matter from the natural gas with the first coalescing filter, and draining the fluid contaminant matter from the first coalescing filter through a remotely controlled first filter drain valve and a liquid drain;
mounting a dryer on the mobile platform, connecting the dryer in fluid communication with the first coalescing filter, and allowing passage of the natural gas through the dryer;
removing water vapor from the natural gas with the dryer and draining the water from the dryer through a remotely controlled dryer drain valve and the liquid drain;
mounting a particulate filter on the mobile platform, connecting the particulate filter in fluid communication with the dryer, and allowing passage of the natural gas through the particulate filter;
removing particulate matter from the natural gas with the particulate filter, and allowing water to drain from the particulate filter through the liquid drain;

mounting a first membrane on the mobile platform, connecting the first membrane in fluid communication with the particulate filter, and allowing passage of the natural gas through the first membrane;

separating the natural gas into a retentate gas and a permeate gas with the first membrane, allowing passage of the permeate gas through the first membrane, and restricting passage of the retentate gas through the first membrane;

connecting a retentate valve in fluid communication with the first membrane, and controlling the retentate gas exiting the first membrane with the retentate valve; and connecting a permeate valve in fluid communication with the first membrane, and controlling the permeate gas exiting the first membrane with the permeate valve.

28. The method of claim 27, further comprising:

mounting a separator on the mobile platform, connecting the separator in fluid communication with the natural gas source and the liquid drain, and allowing passage of the natural gas through the separator; and removing liquid contaminant matter from the natural gas with the separator, and draining the liquid contaminant matter from the separator through a remotely controlled separator drain valve and the liquid drain.

29. The method of claim 28, further comprising:

mounting a second coalescing filter on the mobile platform, connecting the second coalescing filter in fluid communication with the particulate filter and the liquid drain, and allowing passage of the natural gas through the second coalescing filter; and removing particulate matter and fluid contaminant matter from the natural gas with the second coalescing filter, and draining the fluid contaminant matter from the second coalescing filter through a remotely controlled second filter drain valve and a liquid drain.

30. The method of claim 29, further comprising:

mounting a second membrane on the mobile platform, connecting the second membrane in fluid communication with the particulate filter, and allowing passage of the natural gas through the second membrane; and separating the natural gas into a retentate gas and a permeate gas with the second membrane, allowing passage of the permeate gas through the second membrane, and restricting passage of the retentate gas through the second membrane.

31. The method of claim 27, further comprising mounting a thermoelectric generator on the mobile platform, supplying process electricity with the thermoelectric generator, and powering the thermoelectric generator with the natural gas.

32. The method of claim 31, further comprising:

mounting a process control on the mobile platform, operatively connecting the process control to the source natural gas valve, the retentate valve, the permeate valve, and the thermoelectric generator, and controlling the natural gas processing with the process control;

operatively connecting a plurality of temperature measuring instruments to the process control;

operatively connecting a plurality of pressure measuring instruments to the process control;

operatively connecting a plurality of flow measuring instruments to the process control; and controlling the remotely controlled valves and operatively connected instruments with the process control.

33. The method of claim 31, further comprising:

mounting an instrument gas supply having an instrument gas accumulator on the mobile platform, connecting the accumulator in fluid communication with the first membrane, and supplying the accumulator with pressurized retentate gas from the first membrane;

storing and releasing retentate gas in the accumulator upon demand;

connecting the accumulator in fluid communication with the control valves, and operating the control valves with the pressurized retentate gas; and connecting the instrument gas supply to the thermoelectric generator, and supplying retentate gas fuel to the thermoelectric generator.

34. The method of claim 32, further comprising:

connecting an inlet pressure control valve in fluid communication with the natural gas source;

operatively connecting the inlet pressure control valve to the process control; and controlling a pressure of the natural gas entering the natural gas processing system with the inlet pressure control valve.

35. The method of claim 34, further comprising:

connecting at least one retentate pressure control valve in fluid communication with the first membrane and downstream of the first membrane;

operatively connecting the retentate pressure control valve to the process control;

controlling a pressure of the retentate gas downstream of the first membrane with the retentate pressure control valve;

connecting a permeate pressure control valve in fluid communication with the first membrane and downstream of the first membrane;

operatively connecting the permeate pressure control valve to the process control; and controlling a pressure of the permeate gas downstream of the first membrane with the permeate pressure control valve.

36. The method of claim 35, further comprising:

mounting a first heat exchanger on the mobile platform, connecting the first heat exchanger in fluid communication with the first membrane and upstream of the first membrane, and allowing passage of the natural gas through the first heat exchanger;

changing a temperature of the natural gas entering the first membrane with the first heat exchanger;

connecting a temperature control valve in fluid communication with the first heat exchanger and the first membrane;

operatively connecting the temperature control valve to the process control; and controlling the temperature of the natural gas entering the first membrane with the temperature control valve.

* * * * *